United States Patent
Oude Roelink

(10) Patent No.: US 9,555,973 B2
(45) Date of Patent: Jan. 31, 2017

(54) CONVEYOR AND METHOD OF PRODUCING A CONVEYOR

(71) Applicant: Jonge Poerink Conveyors B.V., Borne (NL)

(72) Inventor: Anthonius Gerhardus Oude Roelink, Rijssen (NL)

(73) Assignee: Jonge Poerink Conveyors B.V., Borne (NL)

( * ) Notice: Subject to any disclaimer, the term of this patent is extended or adjusted under 35 U.S.C. 154(b) by 0 days.

(21) Appl. No.: 14/762,953

(22) PCT Filed: Jan. 24, 2014

(86) PCT No.: PCT/NL2014/050039
§ 371 (c)(1),
(2) Date: Jul. 23, 2015

(87) PCT Pub. No.: WO2014/116115
PCT Pub. Date: Jul. 31, 2014

(65) Prior Publication Data
US 2015/0321853 A1    Nov. 12, 2015

(30) Foreign Application Priority Data
Jan. 25, 2013    (NL) .................................... 2010186

(51) Int. Cl.
*B65G 21/06*    (2006.01)
*B65G 15/62*    (2006.01)
(Continued)

(52) U.S. Cl.
CPC ............... *B65G 21/06* (2013.01); *B29D 29/06* (2013.01); *B65G 15/62* (2013.01); *B65G 21/105* (2013.01);
(Continued)

(58) Field of Classification Search
CPC ....... B65G 21/06; B65G 21/105; B65G 21/02; B65G 21/10; B65G 21/20; B65G 21/14; B65G 21/22; B65G 41/006; B29D 29/06; B29K 2101/12
(Continued)

(56) References Cited

U.S. PATENT DOCUMENTS 3,724,646 A * 4/1973 Kornylak ............... B65G 21/02
198/821
4,467,913 A * 8/1984 Salloum ................. B65G 17/20
104/89
(Continued)

FOREIGN PATENT DOCUMENTS

| DE | 102006010974 A1 | 9/2007 |
| EP | 0480863 A1 | 4/1992 |
| EP | 0492058 A1 | 7/1992 |

OTHER PUBLICATIONS

Wikipedia, "Rotational Molding", Sep. 2012.*

*Primary Examiner* — Mark A Deuble
(74) *Attorney, Agent, or Firm* — The Webb Law Firm

(57) ABSTRACT

The invention relates to a conveyor part, having a conveyor track, wherein the conveyor track comprises at least one rotary moulded conveyor track structure. The invention further relates to a method of manufacturing a conveyor part comprising the following steps, to be performed in any suitable order: providing a rotary mould having a cavity shaped as the outside of a conveyor portions, adding a thermoplastic or resinous material inside the mould, rotating the mould under gradually heating the mould, allowing the thermoplastic material to melt and to cover the inner walls of the mould or allowing the resinous material to cure on the inner walls of the mould, allowing the mould to cool, opening the mould to remove the conveyor part.

13 Claims, 14 Drawing Sheets

(51) Int. Cl.
*B29D 29/06* (2006.01)
*B65G 21/10* (2006.01)
*B65G 21/20* (2006.01)
*B65G 41/00* (2006.01)
*B29K 101/12* (2006.01)

(52) U.S. Cl.
CPC ............ *B65G 21/20* (2013.01); *B65G 41/006* (2013.01); *B29K 2101/12* (2013.01)

(58) Field of Classification Search
USPC .............................................. 198/860.1, 841
See application file for complete search history.

(56) References Cited

U.S. PATENT DOCUMENTS

| | | | | |
|---|---|---|---|---|
| 4,471,867 A * | 9/1984 | Forshee | ................. | B61B 13/04 104/111 |
| 4,484,525 A * | 11/1984 | Forshee | ................. | B61B 13/04 104/95 |
| 4,560,139 A * | 12/1985 | Dahlke | ................. | A21C 13/02 198/714 |
| 4,961,492 A * | 10/1990 | Wiseman | ............. | B65G 17/086 198/841 |
| 5,788,056 A * | 8/1998 | Clopton | ................. | B65G 13/10 198/779 |
| 6,848,572 B1 * | 2/2005 | Sisson, Jr. | ............. | B65G 21/22 198/860.1 |
| 7,121,400 B2 * | 10/2006 | Fandella | ............. | B65G 17/086 198/619 |
| 7,971,701 B2 * | 7/2011 | Fourney | ................. | B65G 17/24 198/370.01 |
| 2002/0174795 A1 * | 11/2002 | Baier | ..................... | B65G 21/10 104/130.07 |
| 2005/0155847 A1 * | 7/2005 | Munoz-Guerra | ...... | B65G 21/06 198/841 |

\* cited by examiner

CONVEYOR AND METHOD OF PRODUCING A CONVEYOR

CROSS-REFERENCE TO RELATED APPLICATIONS

This application is the United States national phase of International Application No. PCT/NL2014/050039 filed Jan. 24, 2014, and claims priority to Netherlands Patent Application No. 2010186 filed Jan. 25, 2013, the disclosures of which are hereby incorporated in their entirety by reference.

BACKGROUND OF THE INVENTION

Field of the Invention

The invention relates to a conveyor.

More specifically, the invention relates to more flexible and less expensive conveyor systems and to a method of their manufacture.

Description of Related Art

In the art, conveyor systems are widely used. Mostly a conveyor comprises some basic components: a support frame, a chain or belt track, a belt or chain, a drive system end and a belt or chain return end.

In the art the conveyor track is manufactured of metal parts e.g. extruded aluminium elements, which are bolted or welded together. This provides a sturdy, yet rather heavy and inflexible conveyor system. For less demanding applications and higher flexibility, e.g. when product pathways are changed frequently, conveyors of the art are less suitable. Furthermore, they are more cumbersome to disassemble and reassemble. Accordingly it is an object of the invention to mitigate or solve the above described and/or other problems of belt and chain link conveyors in the art, while maintaining and/or improving the advantages thereof.

More specifically the object of the invention can be seen in improving the flexibility of belt and chain link conveyors while reducing the cost of manufacture of the same.

SUMMARY OF THE INVENTION

These and/or other objects are reached by a conveyor part, suitable for a belt or chain conveyor, having a conveyor track portion, wherein the conveyor track portion comprises at least one rotary moulded conveyor track structure. This can provide a more cost effective manufacturing technique, which can produce portions which can very flexibly be applied. Furthermore conveyors made of these parts are relative light and versatile in application. The inner space of the rotary moulded structure can be hollow. Thus a light weight sturdy elements can be produced that comprise a relative low amount of construction material and can be more easily connected. For instance customised track portions can be sawn at any desired length and yet be connected to other track parts. The conveyor track can comprise a central guiding slit. In this guiding slit, rollers, mounted on the belt or the conveyor links can be guided. Thus wear at the side walls of the track and enhanced friction may be reduced. For straight portions, the central guiding slit may be omitted, whereas in curved portions, application can be advantageous. The conveyor part may comprise slide bar connectors. The slide bars can provide additional strength and can avoid wear of the support surface of the conveyor track. The slide bar connectors may be longitudinal slits. At least one abutting end of the track portion can be provided with a first connector. Thus the track parts can be interconnected, rendering the system flexible and versatile similar to a toy train track. A second abutting end can similarly be provided with a second connector. The first and/or the second connector can of the male or of the female type. The female type connector can comprise a male connector receiving space for a tight fit. By a close fit, the separate parts can be prevented from moving relative to each other. Thus wear and hook ups of a track or belt can be prevented and a smooth ride of the belt or chain can be improved. In a dedicated part, the first abutting end opposing second end can comprise a shaft or axle, configured to guide a belt or a chain return. The shaft can be connected to a drive, e.g. an electric motor eventually provided with a gear. Thus a chain or belt conveyor can be assembled comprising at least an intermediate conveyor portion, a return end conveyor part and drive end conveyor part. Thus the two return ends can allow a transport flight and a return flight of the conveyor belt or chain to run as a closed loop over the conveyor assembled from the separate portions. In this conveyor the return axle can be configured to run idle. Alternatively on both ends of a completed track, two drive units can be placed. This arrangement can be applied e.g. for a better transport of the return part of the conveyor chain or conveyor belt.

A further aspect of the invention is a method of manufacturing a conveyor portion comprising the following steps, to be performed in any suitable order: providing a rotary mould having a cavity shaped as the outside of any of the herein above described parts, adding a thermoplastic or resinous material inside the mould, rotating the mould under gradually heating the mould, allowing the thermoplastic material to melt and to cover the inner walls of the mould or allowing the resinous material to cure on the inner walls of the mould, allowing the mould to cool, opening the mould to remove the conveyor portion. Thus flexible and cost effective conveyor parts can be manufactured.

BRIEF DESCRIPTION OF THE DRAWINGS

In order to further elucidate the invention, exemplary embodiments will be described with reference to the drawing. In the drawing.

DETAILED DESCRIPTION OF THE INVENTION

Figure 1:
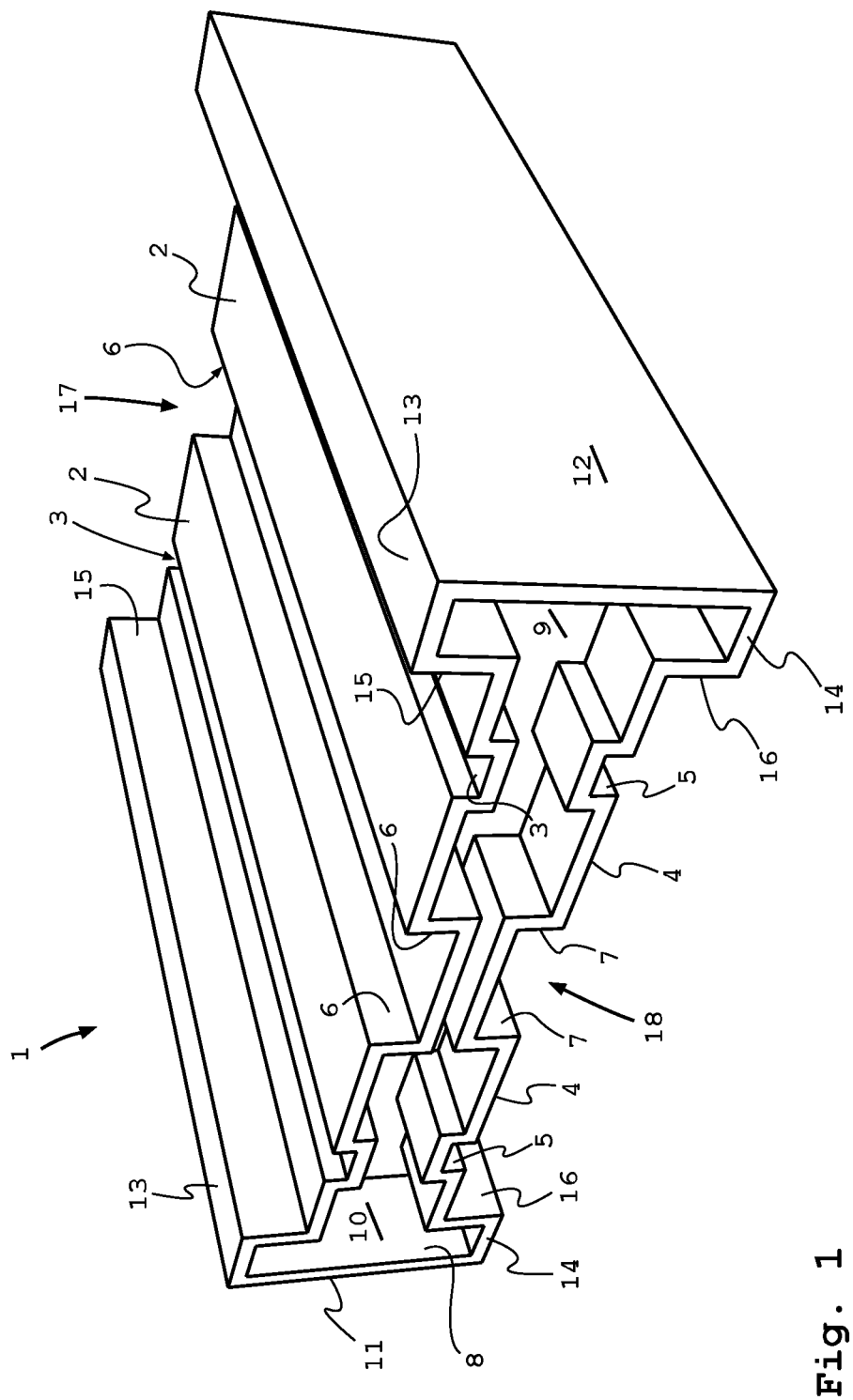
FIG. 1 depicts a first schematic perspective view of a conveyor track portion according to an embodiment of the invention.

The figures represent specific exemplary embodiments of the inventions and should not be considered limiting the invention in any way or form. Throughout the description and the figures the same or corresponding reference numerals are used for the same or corresponding elements.

The expression "longitudinal" used herein is to be understood as, though not to be considered limited to the direction similar to the direction of motion of the belt or conveyor chain links within the conveyor track.

The expression "abutting end or abutting surface" used herein is to be understood as, though not to be considered limited to the ends of the conveyor track portion, where the track portion is connected to another track portion.

The expression "female or female connector of a track portion" used herein is to be understood as, though not to be considered limited to a connector configured to have an open structure able and suitable for accepting a male connector of a track portion to fit in, preferably such that both portions are aligned and form a continuous combined track when connected.

The expression "track or track portion" used herein is to be understood as, though not limited to a piece or a portion of a conveyor structure, on which a conveyor belt and/or a chain conveyor can move, wherein the conveyor belt or chain is guided or supported by the track or the track portion.

In FIG. 1, a schematic image is presented of a first track portion 1 of a conveyor. The portion 1 comprises a guiding surface 2, on which a conveyor belt or conveyor links can move and be supported. The guiding surface can comprise two slits 3, in which guiding bars may be inserted. These guiding bars can be made out of a durable, low resistance material, in order to reduce friction and/or prevent the surface 2 from wearing off by the belt or links moving over it. Typical material for the guiding bars can be nylons or POM. Other materials with similar qualities may be employed as well.

The guiding surface 2 further is equipped with a central guiding channel 17, provided with sidewalls 6. The side walls 6 are configured to be able to guide rollers or other guiders that can be centrally mounted on the belt or the conveyor links, as is presented in FIGS. 6 and 7.

The side walls 6 can position the belt or chain in the centre of the track portion 1 and can prevent the side of the belt or conveyor links from touching side walls 15. Thus, the side walls 15 can be protected against excessive wear and friction between the moving belt or chain and the track can be reduced.

The track can be manufactured such that the upper side is symmetrical with the lower side, such that the surface 4 can act as a support surface for a belt or conveyor chain, ones the track portion 1 is turned upside down. In that case side walls 7 of central guiding channel 18 will guide the belt or chain. In this position, the guiding bars can be mounted in the slits 5 instead of in slits 3. The advantage of this symmetry between upper and lower side is that one track portion can serve both as a left hand and as a right hand curve. This renders the system even more flexible and versatile.

On a first abutting side, the track portion 1 is provided with a circumferential rim 8, enclosing a female connection space 10. The space 10 is in a longitudinal direction seen, located more inside the track portion 1, bordered by a surface 9. The surface 9 can provide the track portion 1 with additional strength.

Figure 8:
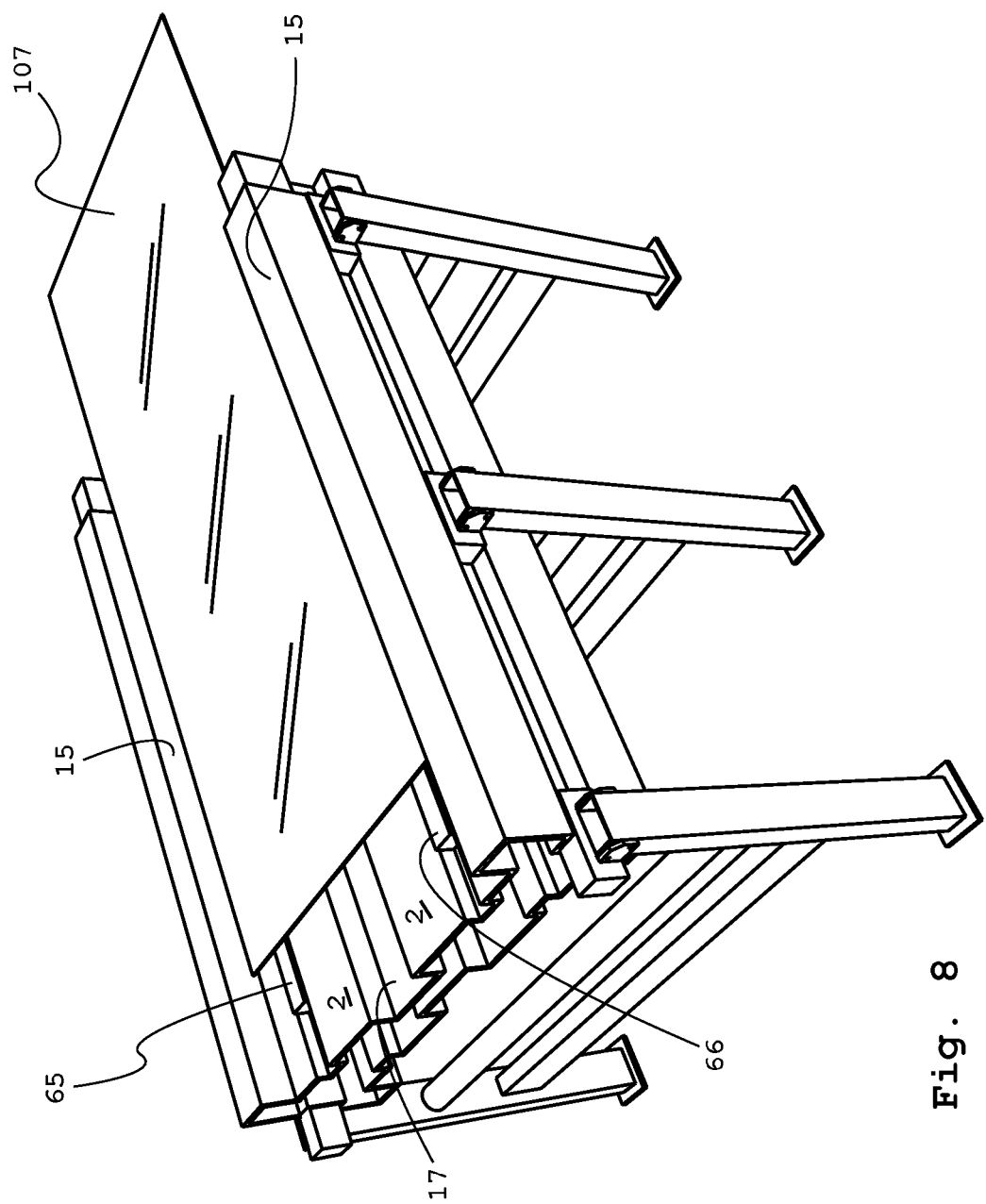
FIG. 8 depicts a schematic perspective view of a track part according to FIG. 6 with a conveyor belt according to another embodiment of the invention.

The complete track portion 1 as depicted in FIG. 1 can be manufactured by rotation moulding. This technique is suitable for making hollow parts, such that material is saved from being used. The track portion 1 can be provided with so called kissing points or kissing surfaces, as is depicted in FIG. 8 and described in more detail herein below.

Figure 2:
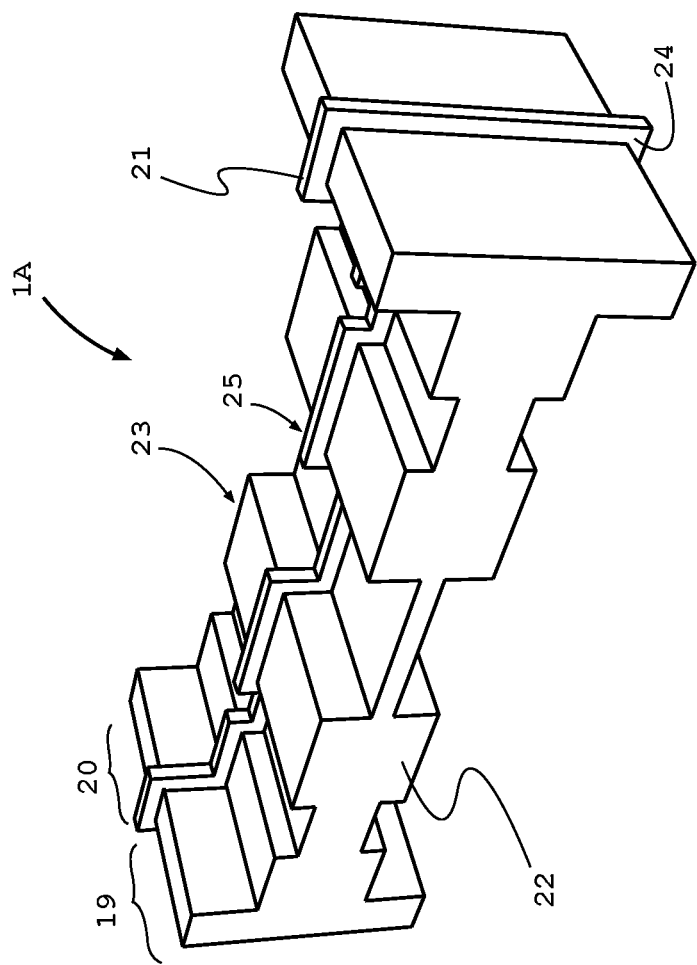
FIG. 2 depicts a schematic perspective view of a track portion according to second embodiment of the invention.

FIG. 2 depicts a short track portion 1A having two male connectors 19 and 20 at its abutting sides. The male connector 19 is having an abutting surface 22, which could face the surface 9 of the track portion 1 when the male connector 19 or 20 is entered in the female connector 10 of the track portion 1.

Between the two male connectors 19 and 20, a rim 21 can be provided. The rim 21 can prevent a too deep insertion of the connector 19 in a female connector. In use with the track portion 1, the abutting surface 24 of the rim 21 can face the abutting surface 14 of the rim 8 of the track portion 1. The circumferential surface of the rim 21 can in use be part of the track.

Figure 3:
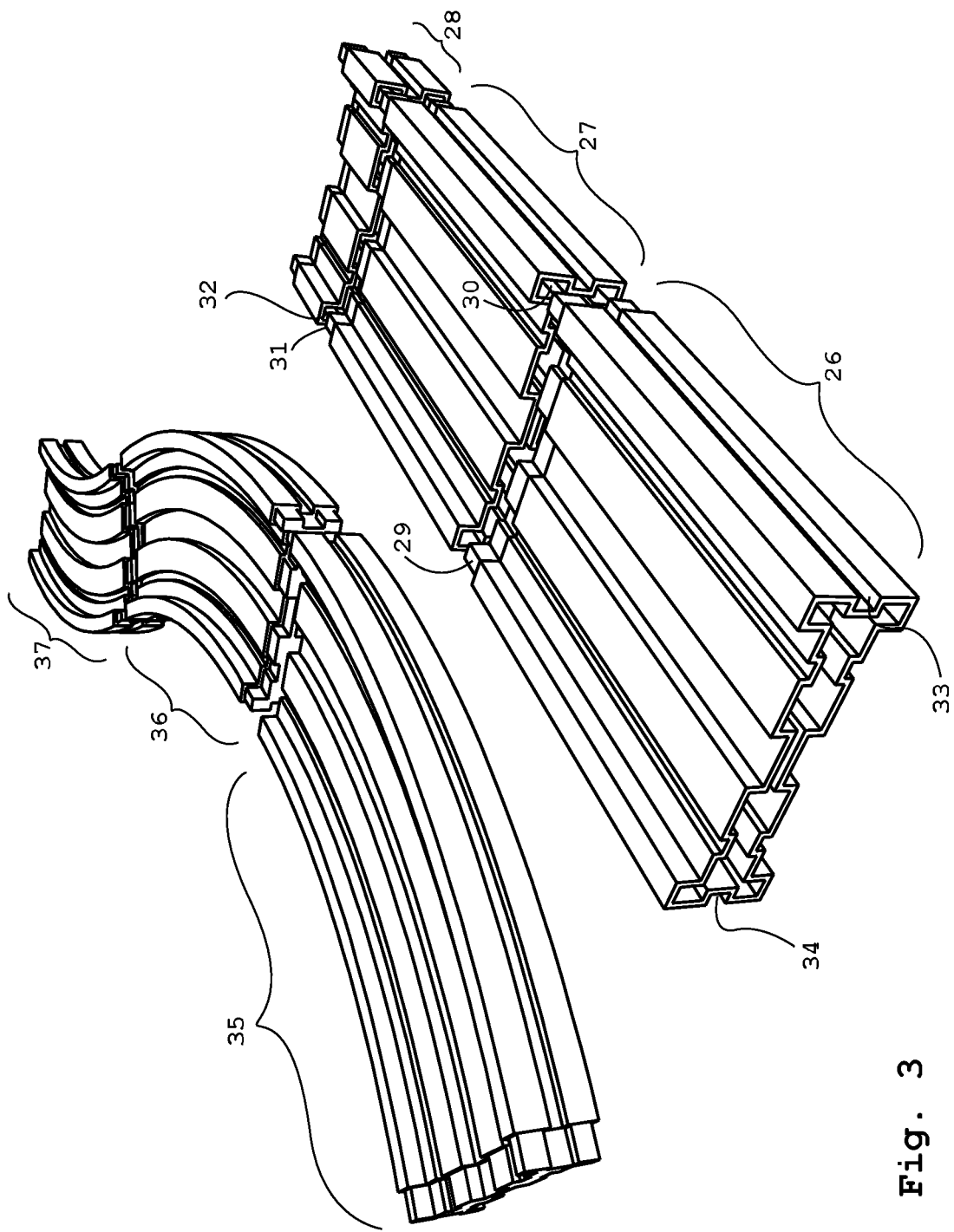
FIG. 3 depicts a schematic perspective view of a number of track portions according to a third embodiment of the invention.

Track portions 1, 1A 26, 27, 28, 35, 36 and 37 can be made at e.g. a series of standard lengths and standard curve portions. A number of radii and a angles in 15 degrees or a multiple thereof may be well suited. The portions 26 and 27 in FIG. 3 are of the same length, whereas the portion 28 is e.g. about one fifth of the length of portion 27. The portions 35 and 36 both are of an angle of 30 degrees, as is the portion 37, which is virtually the same as the portions 35 and 36, except that the portion 37 is turned upside down, such that the curvature of portion 37 is inverted to the curvatures of curve 35 and 36. By making the upper and lower side symmetrical, additional flexibility can thus be provided for. Further the portions 26, 27, 28 35, 36 and 37 in FIG. 3 all are provided with a female 30, 32 and a male 29, 31 connector. All parts may very well be provided with only one species of connector, or even the portions may be sawn to the desired length, after which e.g. the portion 1A with the two male connectors 19 and 20 can be inserted in the sawn through, open abutting end of the thus customised track portion.

Figure 4:
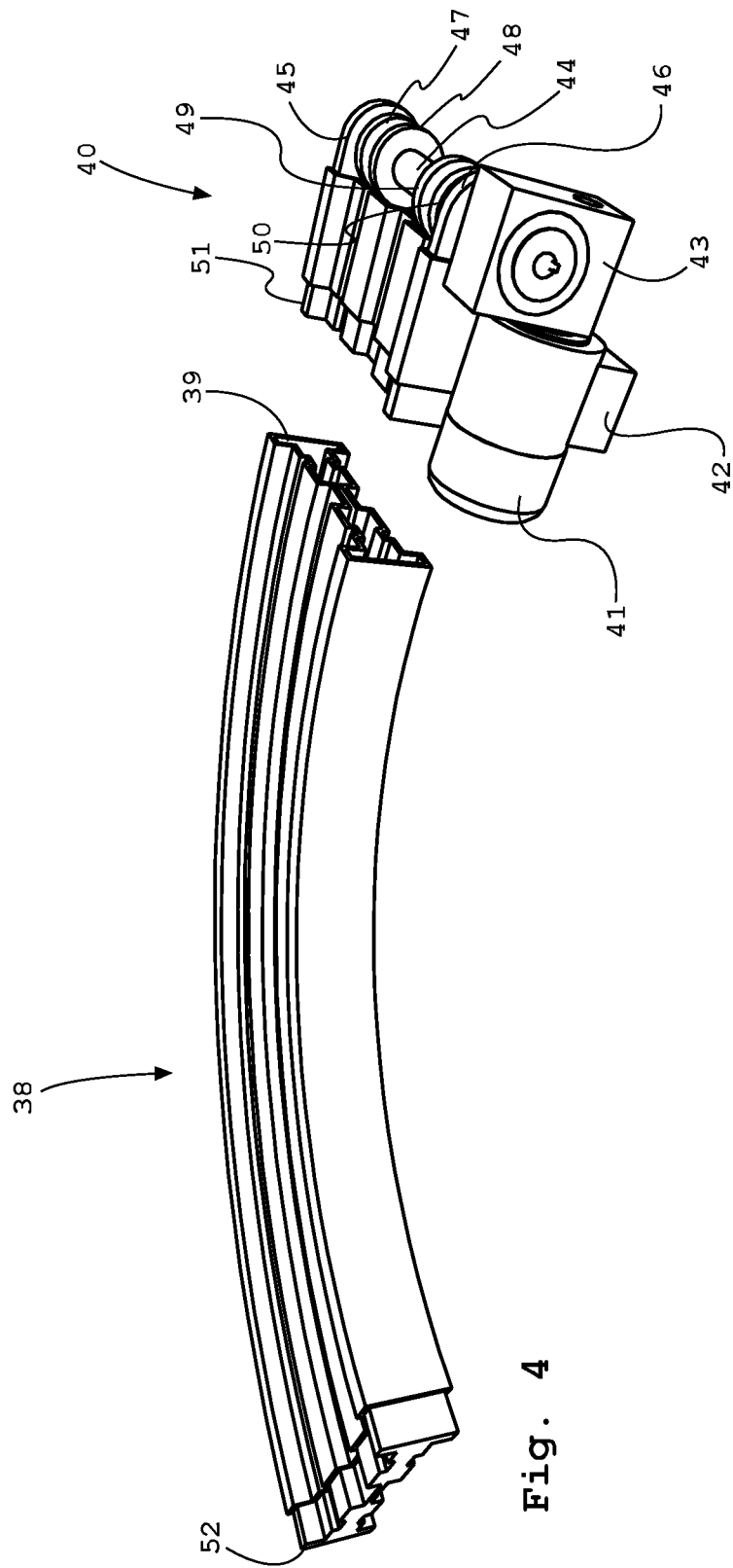
FIG. 4 depicts a schematic perspective view of two track portions according to a fourth embodiment of the invention.

FIG. 4 depicts a dedicated track portion and a curved portion 38. The dedicated track portion is a drive end portion 40, which can be provided with two brackets 45 and 46 holding an axle 44. The axle 44 can be borne in bearings, and is connected to a gear 43. The gear 43 on its turn is connected to a drive shaft of a motor 41. Attached to the axle are sprocket wheels 47, 48, 49 and 50 of which teeth (not shown) can grab into apertures of a belt or spaces between or within links of a conveyor chain. The drive end portion 40 is provided with a male connector 51, which as can be seen in FIG. 4, fits into e.g. the female connector 39 of the curved track portion 38. The portion 38 is on its turn on the other abutting side provided with a male connector 52.

Figure 5:
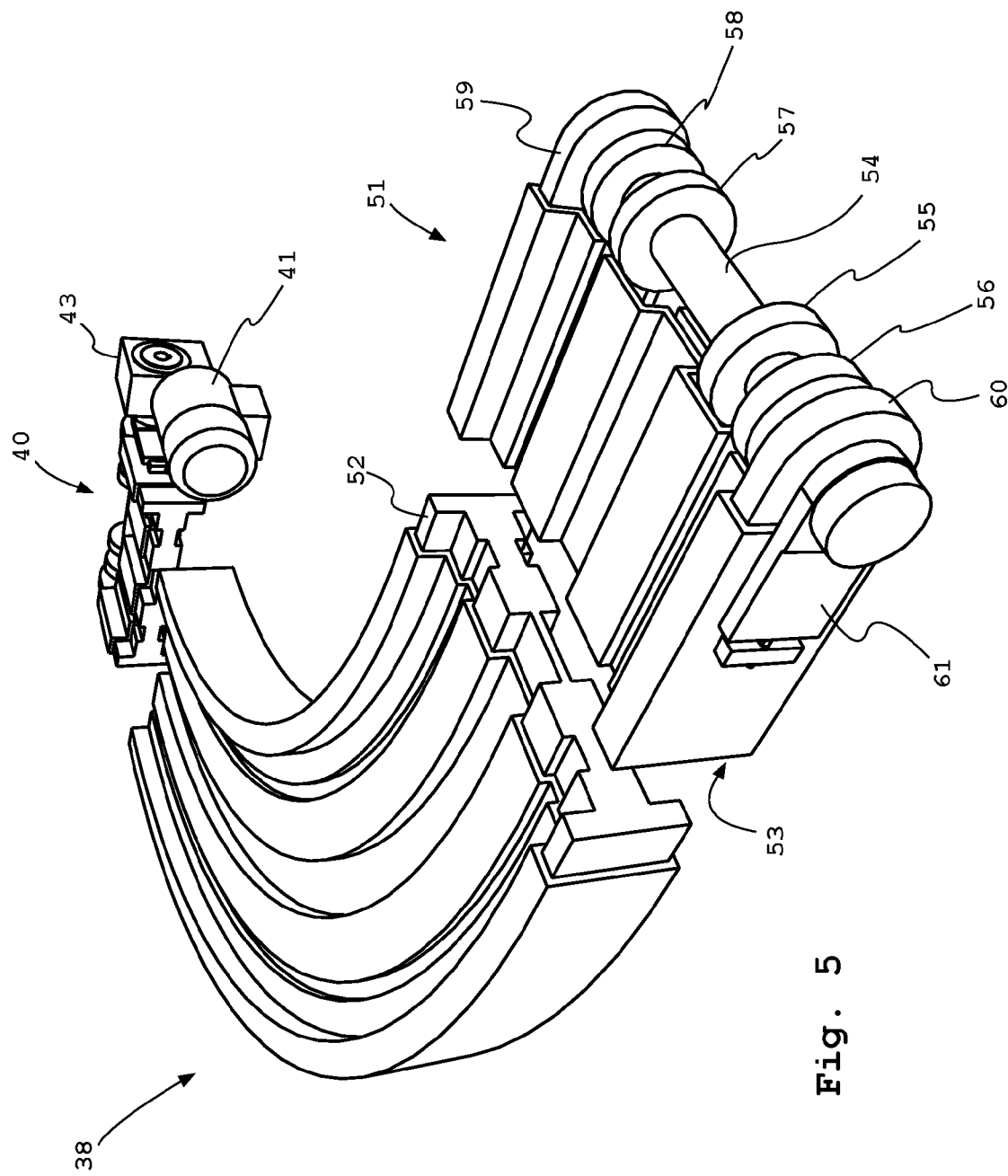
FIG. 5 depicts a schematic perspective view of series of three track portions according to a fifth embodiment of the invention.

FIG. 5 depicts in detail another track end portion, being a return end 51. The return end is provided with two brackets 59 and 60 holding an axle 54. Again the axle 54 can be borne by bearings within the brackets 59 and 60. The axle is provided with a set of idler sprockets or guiding wheels 55, 56, 57 and 58. The axle 54 may be allowed to move in a longitudinal direction, such that a tensioner 61 can be applied in order to adjust the length of the track and thus the tension and play of the belt or conveyor chain.

In FIG. 5, the return track portion 51 is provided with a female connector 53, in which the male connector 52 fits. Once the return track portion 51 and the drive end portion 40 are fitted to the curved track portion 38, a curved conveyor track is completed, such that a chain or a belt can be installed. Thus a remarkably simple system is provided, with a excellent flexibility in extending, adjusting or modifying the tracks.

Figure 6:
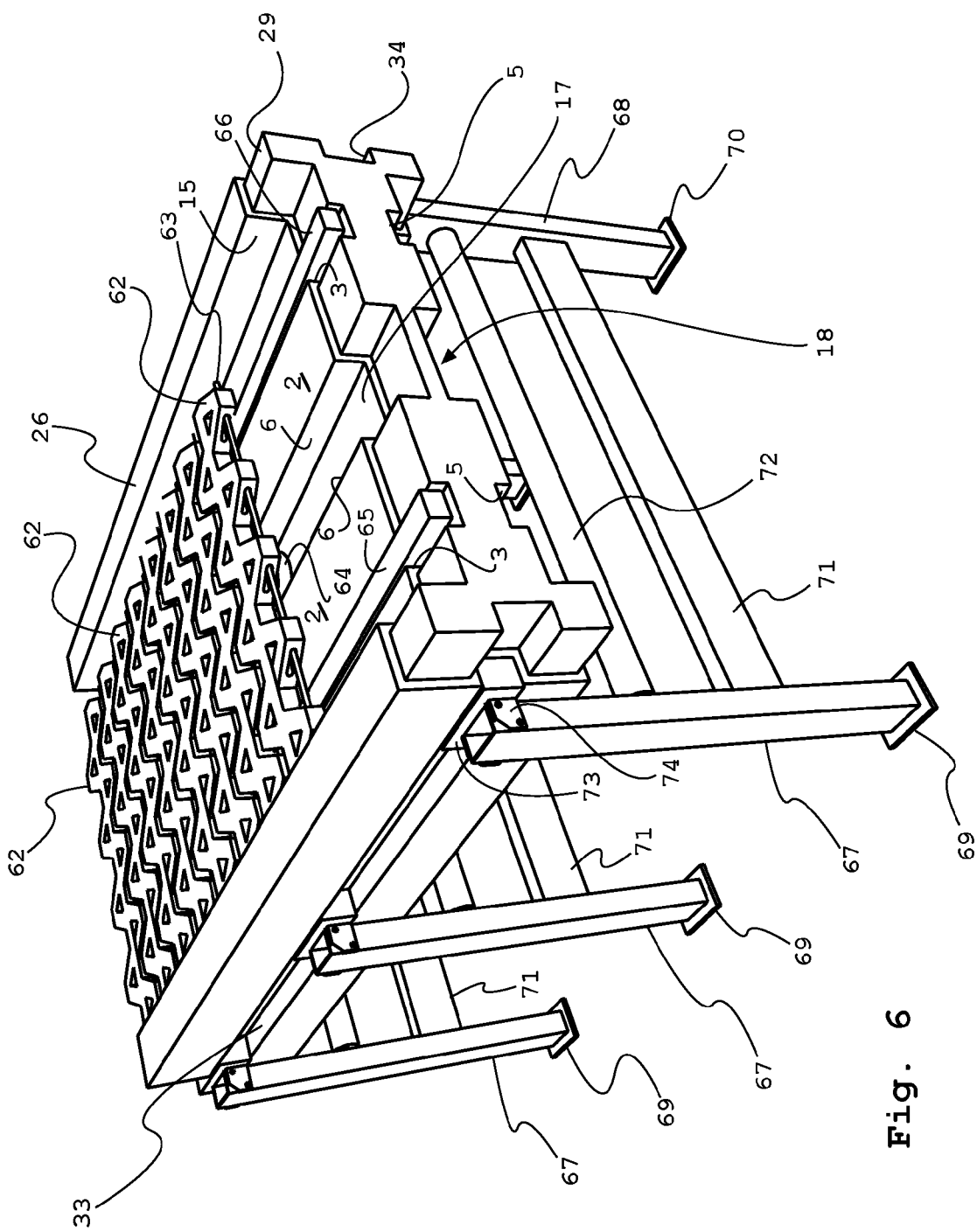
FIG. 6 depicts a schematic perspective view of a conveyor track part with a series of interconnected chain links according to a sixth embodiment of the invention.
Figure 7:
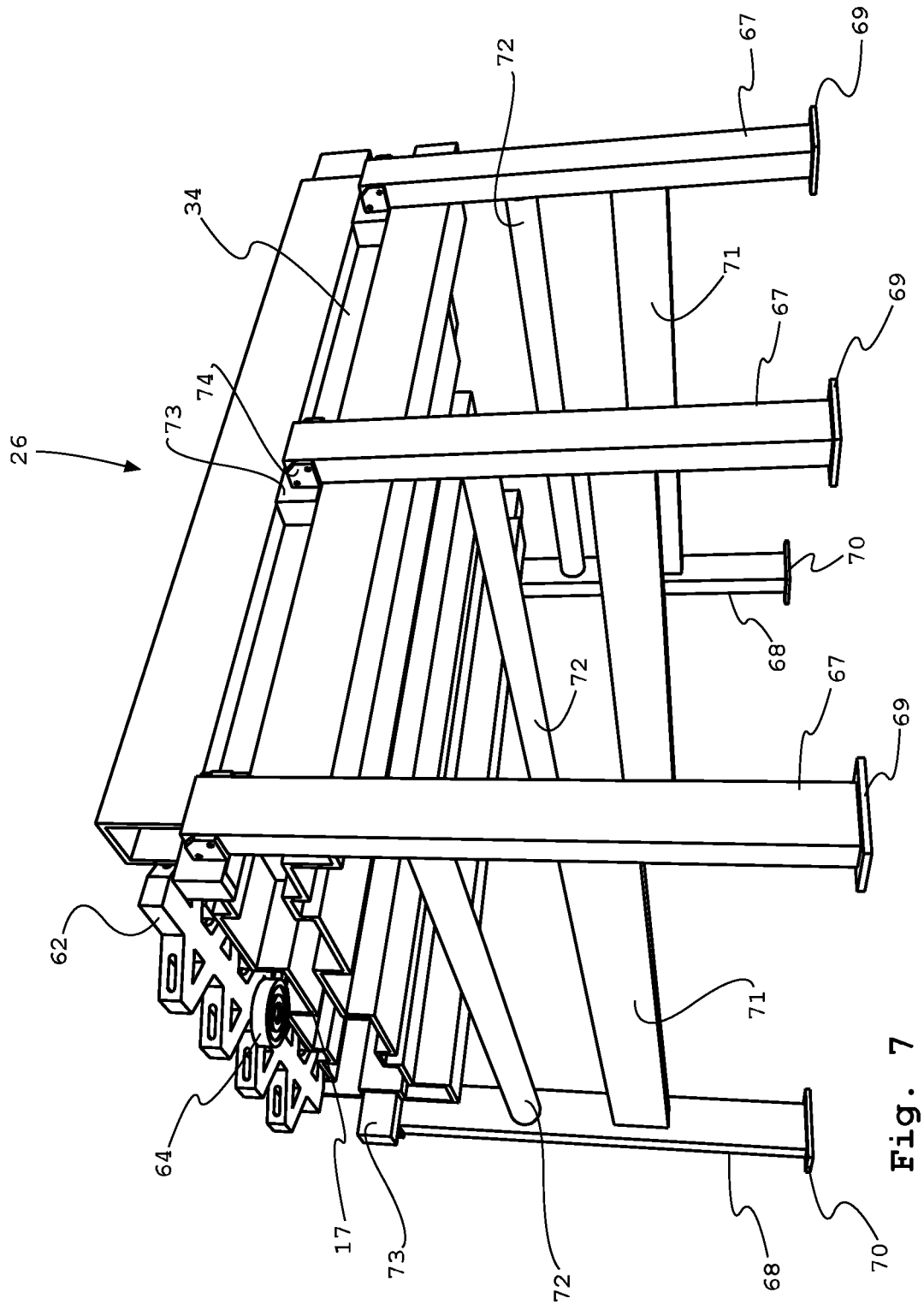
FIG. 7 depicts a schematic perspective view from underneath of the track part as shown in FIG. 6.

In order to support the track at a certain height, a support structure can be installed, as is depicted in FIG. 6 and FIG. 7. In these figures, the track portion 26 is on its sides provided with mounting slits 33 and 34. In the mounting slits, mounting connectors 73 can be placed to which brackets 74 can be connected. The brackets are connected to uprights 67 and 68 which can be provided with support plates 69. The uprights 67 and 68 are interconnected with a beam 71, such that a sturdy support can be given. A set of uprights 68 and 69 and the connectors 73 can be moved longitudinally through the slits 33 and 34 along the track portion 26, such that the supports can be very flexibly altered and customised.

In between the uprights 67 and 68, support rollers 72 may be installed, which can guide the return part of the conveyor belt or the conveyor chains is depicted in FIGS. 6 and 7, a portion of a chain link conveyor is depicted. The chain link conveyor comprises interlocking links 62, which are rotably interconnected by means of pins 63, allowing the links to rotate relative to each other in the two axes perpendicular to the longitudinal direction of the track. In vertical sense, the links of the transport part of the conveyor are supported by guiding rods 65 and 66, which are inserted in the slots 3 and 5 within the support surface 2. In horizontal sense, perpendicular to the longitudinal direction of the track 26, the links 62 are guided by roller 64, which is centrally mounted to the or some of the links 62. The roller 64 can roll against the side walls 6 of the central guide channel 17, which can be seen in FIG. 7.

Alternatively, instead of a chain link conveyor, in all embodiments shown also a cloth, a metal knitted or any other suitable conveyor belt can be applied, as is schematically shown in FIG. 8. In this figure, the conveyor belt 107 rests on the guiding bars 65 and 66. A further guiding bar may be placed in the central guiding slit 17, such that more support is given to the belt 107.

Alternatively or additionally, in mounting slits 33 and 34, guides and chicanes for manipulating the articles to be transported on the conveyor can be installed.

Figure 9:
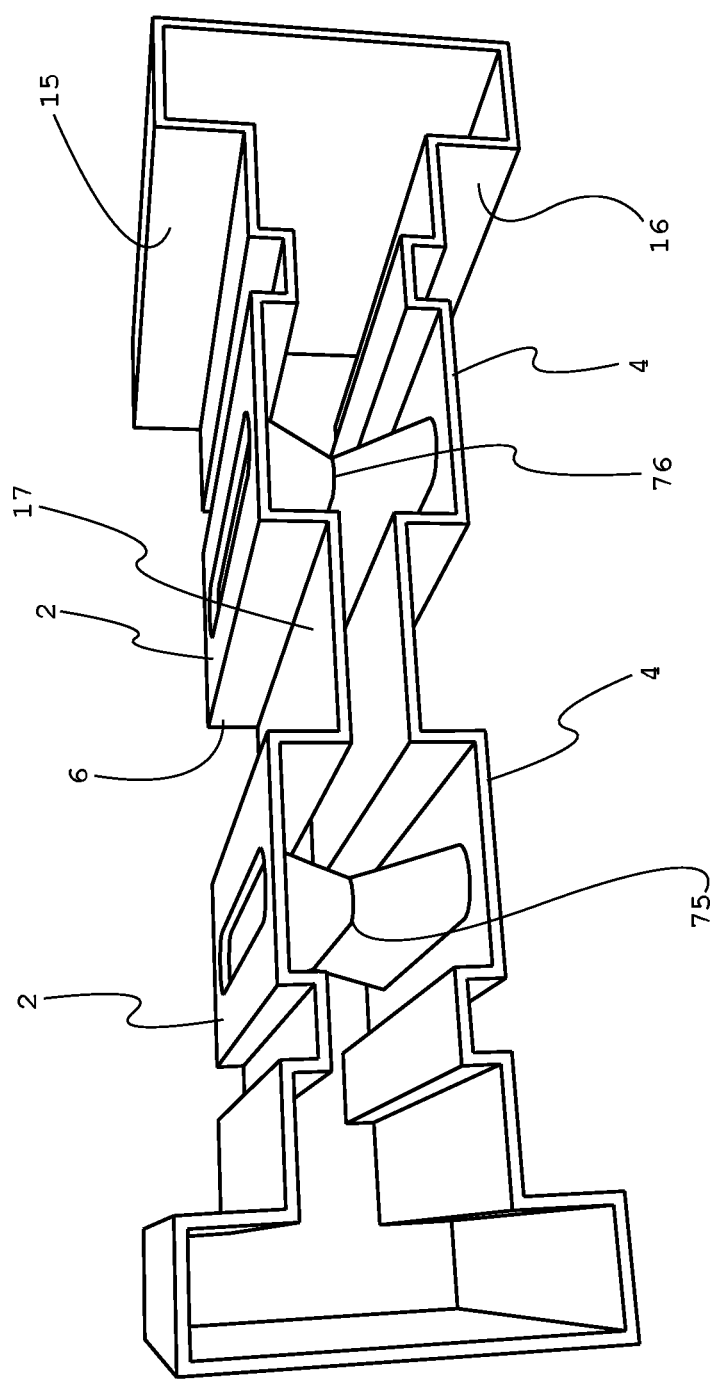
FIG. 9 depicts a schematic cut open view of a track portion according to a further embodiment of the invention.

In order to provide the track portions with additional strength, kissing points 75 and 76 can be applied, as is shown schematically in FIG. 9. In this figure the surface 2 is connected to the opposing surface 4, such that a more sturdy track portion can be obtained.

Figure 10:
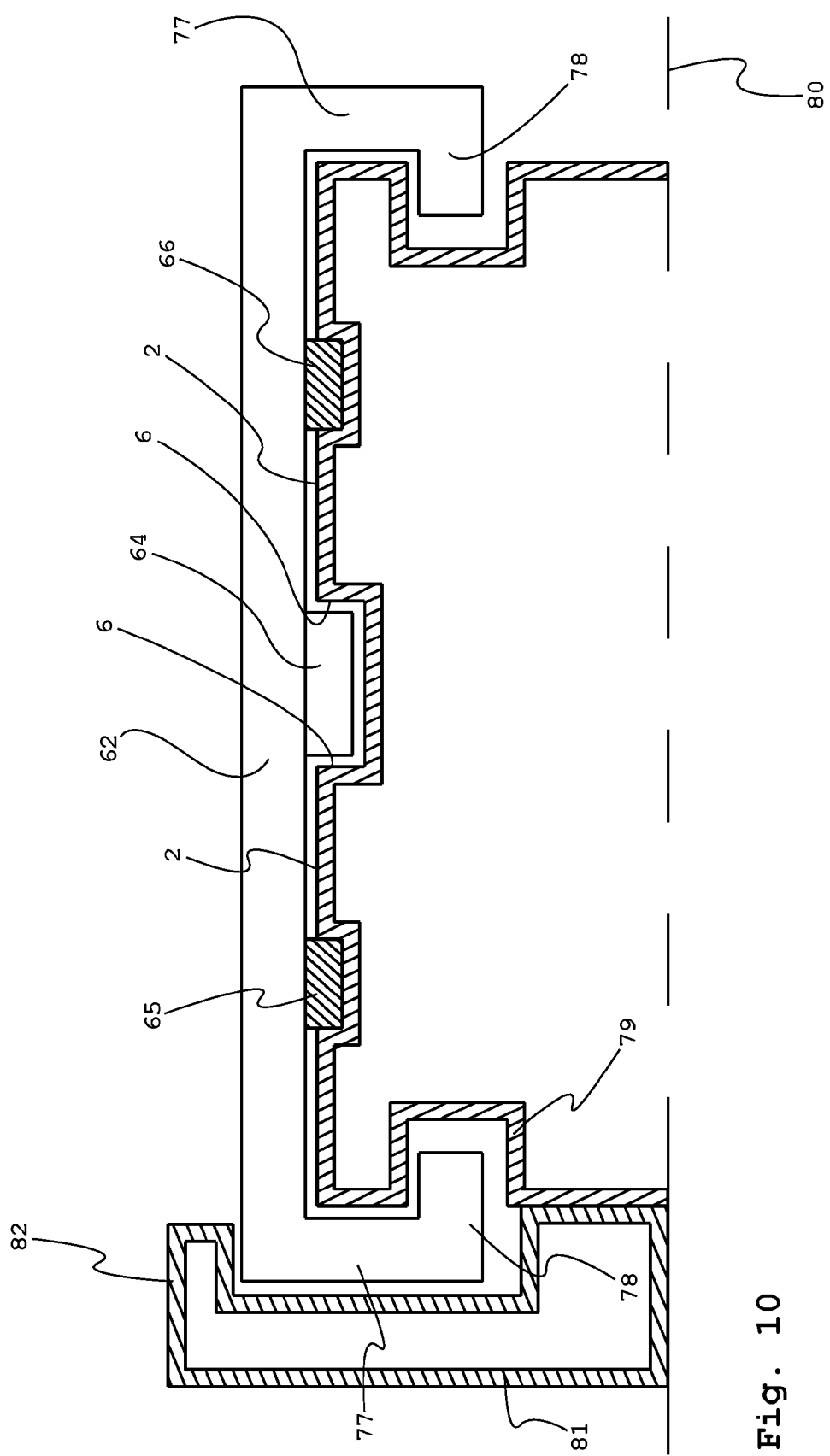
FIG. 10 depicts a schematic cross section of a track portion according to an alternative embodiment of the invention.

In FIG. 10 a cross sectional view of an alternative track portion is depicted. In this figure, a conveyor chain link 62 is provided with a guiding hook 77, which engages with its finger 78 in a guiding slit 79. Thus the conveyor link 62 can be held down on the track portion. Further the track portion is similar to the portions in FIGS. 6 and 7 provided with a central guiding slit 6, in which a guiding roller 64 can fit. The broken line 80 can represent an line of symmetry, in which case the lower side is the same as the top side of the track portion. Below the line 80, the track portion can also be provided with any other suitable form.

On the lateral side of the track portion as represented in FIG. 10, protectors 81 can be mounted. These protectors 81 can similar to track portions be manufactured by rotary moulding. The protector 81 can have a rim 82 which can extend over the chain link 62 such that the chain link 62 is well engaged in the track portion and can be prevented from moving upward.

Figure 11:
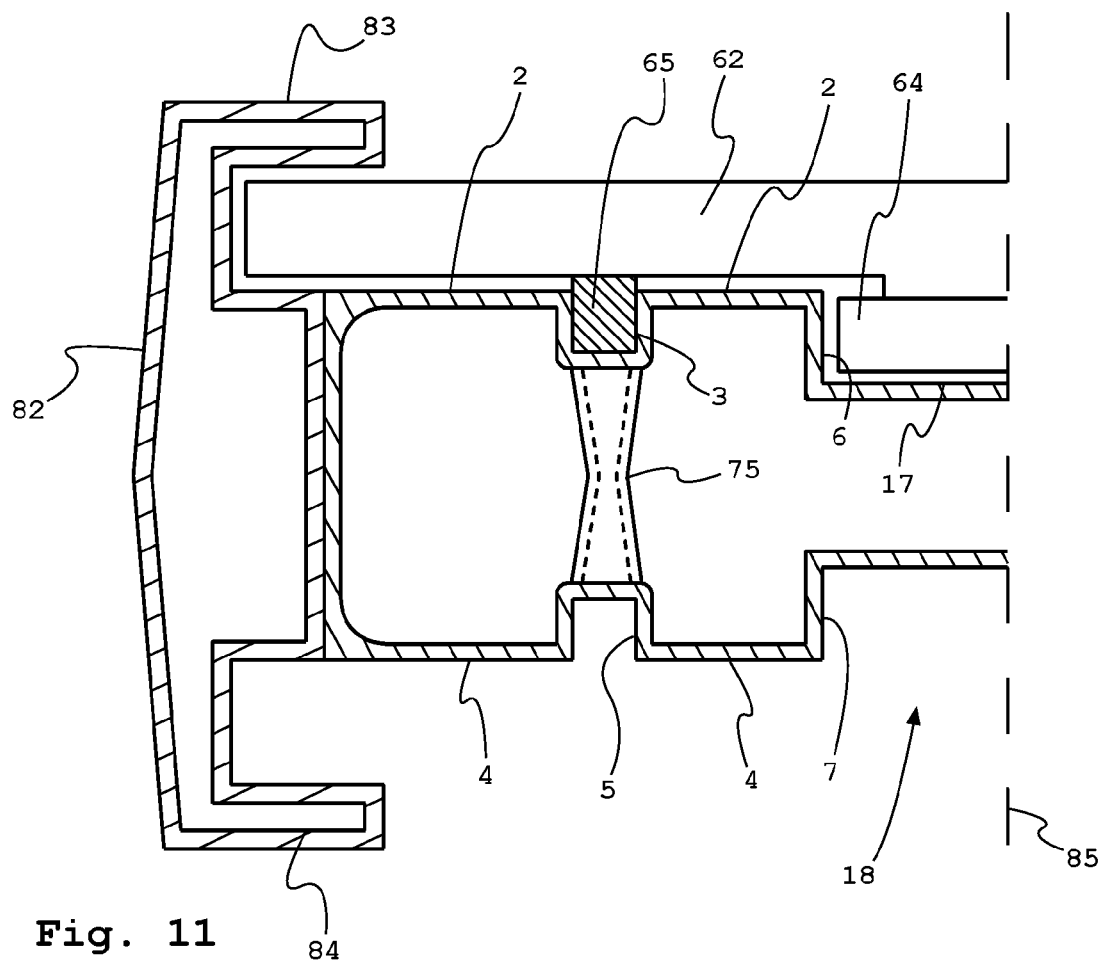
FIG. 11 depicts a schematic cross section of a track portion according to a further embodiment of the invention.

In FIG. 11 a schematic cross sectional view of an alternative track portion is presented. In this track portion, kissing points 75 are arranged between the inner facing walls of the guide slits 3 and 5 instead as in between the support surfaces 2 and 4 as is depicted in FIG. 9. Any combination of these kissing points may be applied as well like e.g. alternating in a direction along the track between the surfaces 2 and 4 and the slits 3 and 5. In this figure, the conveyor links 62 extend sideward beyond the width of the track portion. A protector 82 is mounted on the side of the track portion and the edge 83 engages the lateral ends of the links 62, such that the links 62 are not allowed to move upward and are kept on track. The protector 82 can be manufactured by rotation moulding as well.

Figure 12:
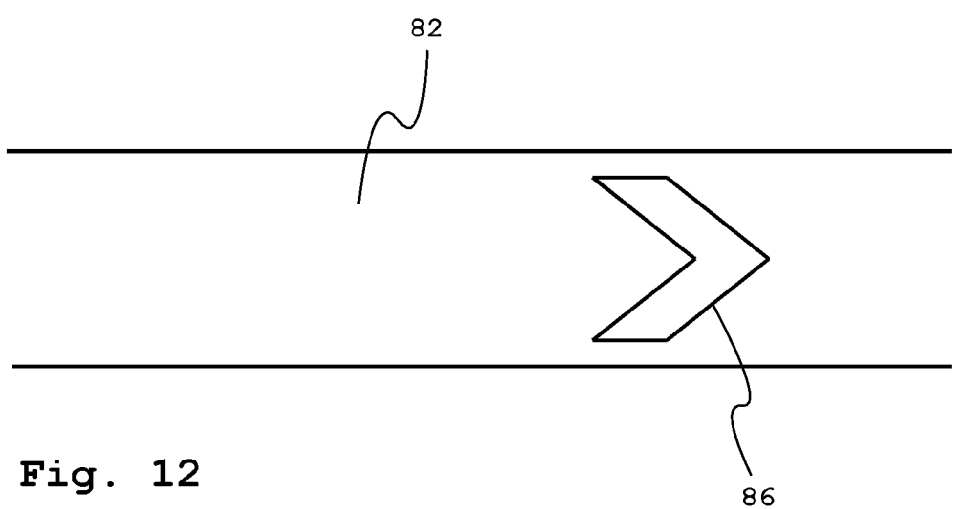
FIG. 12 depicts a schematic side view of a guiding element for a track portion as depicted in FIG. 11 according to another embodiment of the invention.

In FIG. 12 a side view of the protector 82 is presented, where a marking 86 can be provided. In FIG. 12 the marking indicates the direction of motion of the belt, though other information can be provided as well. These markings can be made e.g. in relief inside the rotation mould.

Figure 13:
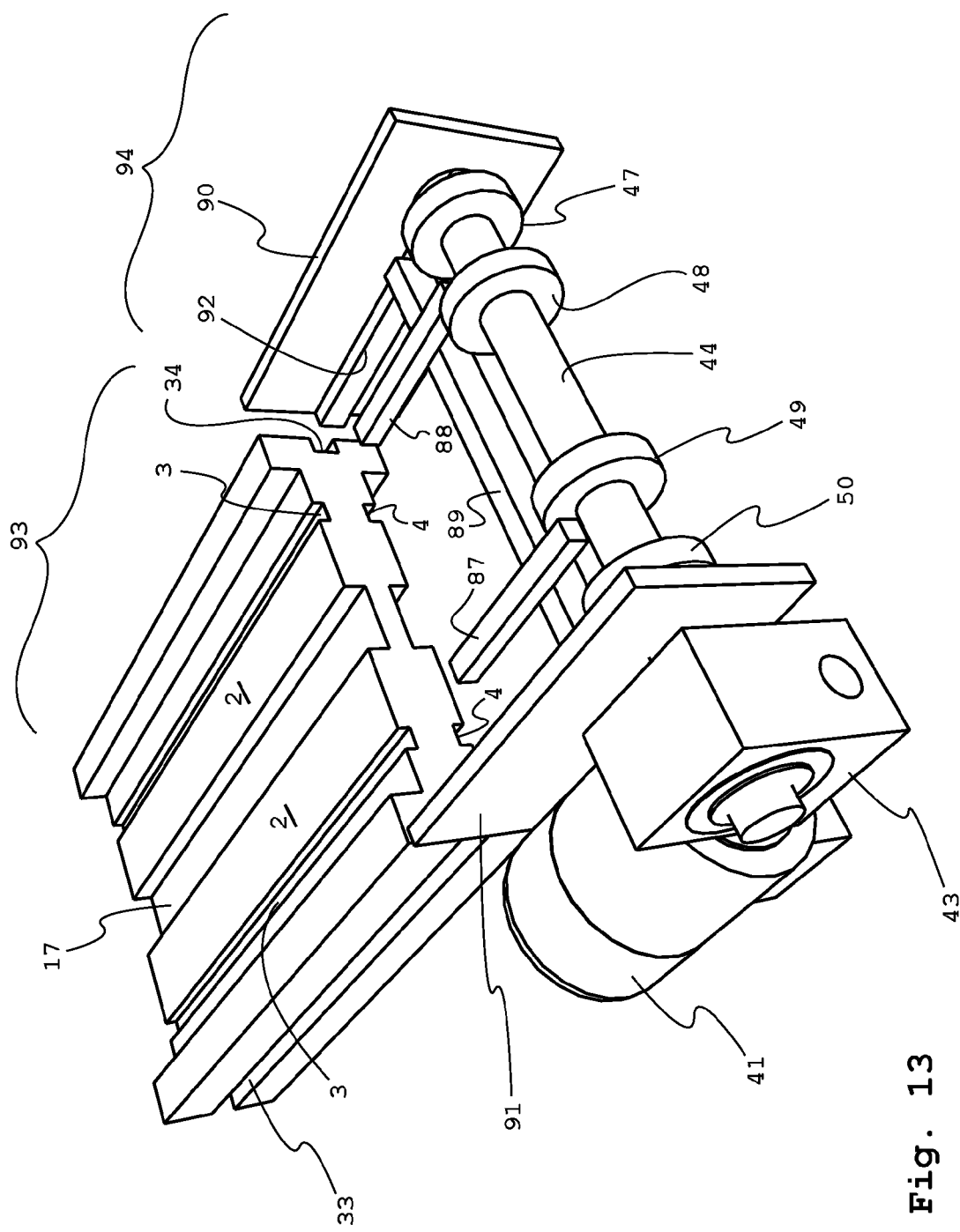
FIG. 13 depicts a schematic perspective view of a drive and a track portion according to yet another embodiment of the invention.

In FIG. 13 an alternative connection for a drive unit 94 is presented. The drive unit 94 comprises a motor 41, a gear 43 and a drive shaft 44. On the drive shaft, sprocket wheels 47, 48, 49 and 50 are installed for transferring the rotation of the shaft 44 into a motion of a belt or conveyor chain. The drive unit 94 comprises two side panels 90 and 91, which are interconnected by means of a cross bar 89. The side panels 90 and 91 hold the axle 44 in place e.g. by bearings (not shown). On the cross bar 89 two inserts 87 and 88 are mounted. On a first abutting end, these inserts 87 and 88 fit inside the guiding slits 3 of the track portion 93 and on the first end opposing second end they extend beyond the perimeter of the sprocket wheels 48 and 49. In this way a conveyor belt or a conveyor chain can be neatly guided onto the sprocket wheels, without building a pocket.

The side panels 90 and 91 are further provided with inserts 92, which fit into the mounting slits 33 and 34. The cooperation between the inserts 88, 89 and 92 on the one hand and the slits 3, 33 and 34 on the other provides a sturdy, yet in longitudinal direction adjustable connection between the track portion 93 and the drive unit 94. In the herein above described figures, most inner corners of the rotation moulded components are depicted as well defined sharp 90 degree corners. Since these components are however manufactured by rotation moulding, the corners tend to cool down quicker than it adjacent surfaces during the cooling phase. Thus in general in the corners and inner edges 95, 96 and 97, more material solidifies during cooling, such that these corners contain more material and are substantially rounded on the inner side.

Figure 14:
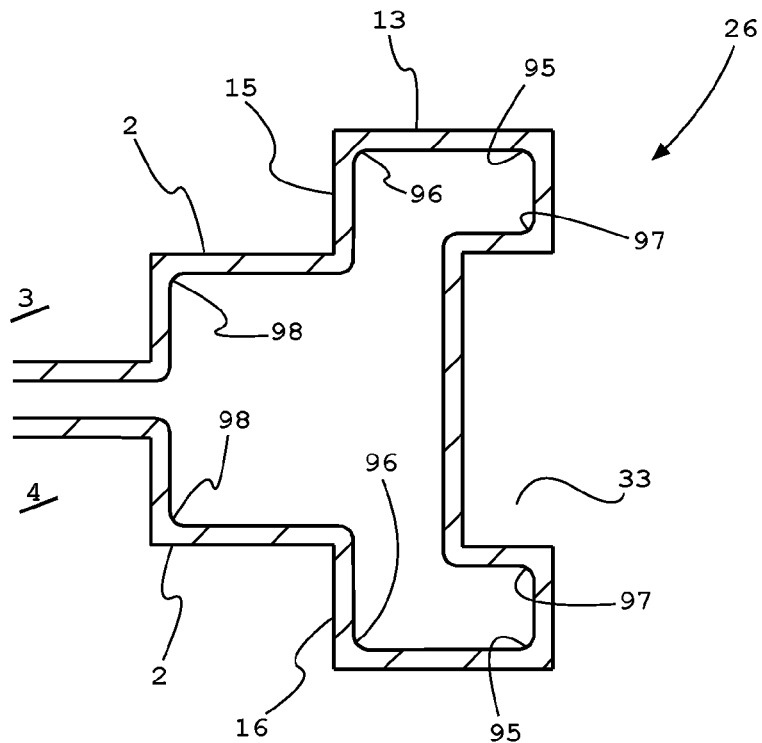
FIG. 14 depicts a schematic cross sectional view of a track portion according to a further embodiment of the invention.
Figure 15:
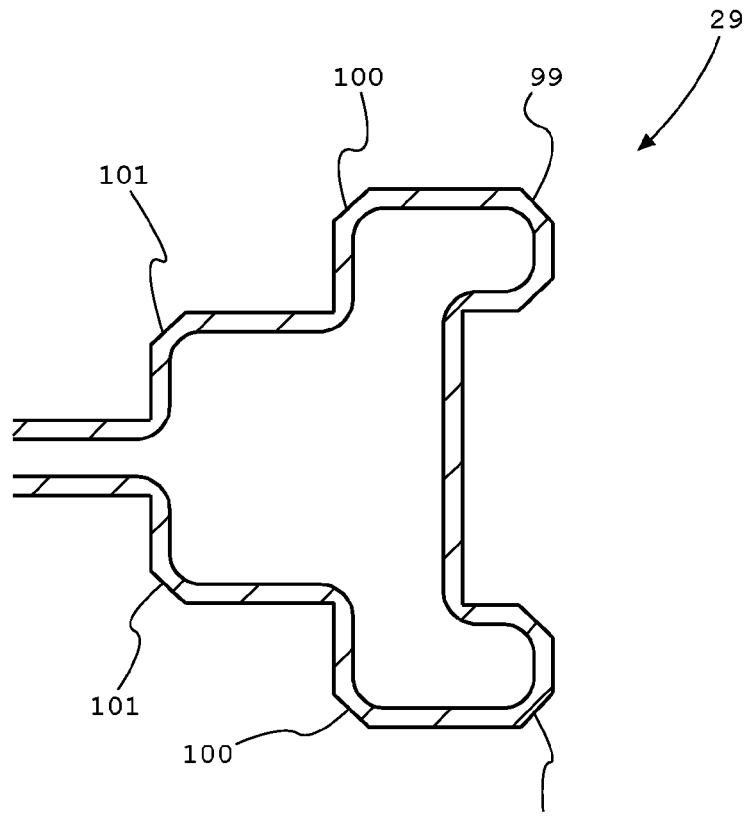
FIG. 15 depicts a schematic cross sectional view of a track portion connector suitable for the track portion according to FIG. 14.

This effect is depicted in the schematic cross sectional view of FIG. 14. In order to obtain a well-fitting system, the outer corners of the male connectors may be skewed, as is depicted in FIG. 15. Here the corners 99, 100, and 101 are provided with substantially slightly skewed surfaces, in order to be able to provide a good fit.

Figure 16:
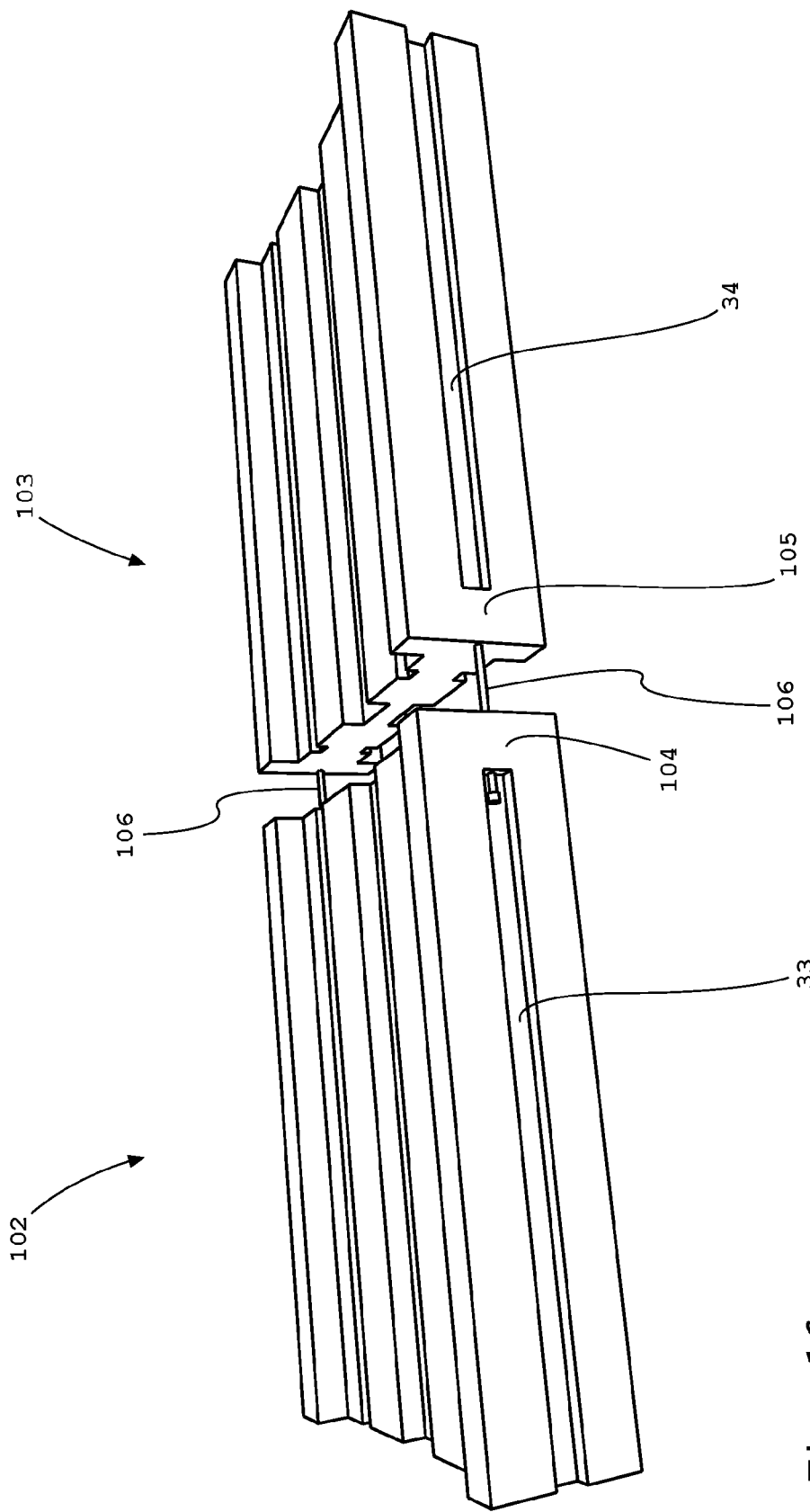
FIG. 16 depicts a schematic perspective view of a connection between two track portion according to a further embodiment of the invention.

Finally in FIG. 16, an alternative connection is shown. The each other facing abutting ends of two track portions 102 and 103 are respectively provided with integrated material fill-ups 104 and 105 in the respective mounting slits 33 and 34. The fill-ups 104 and 105 are provided with a through bore, through which a bolt 106 can be inserted. By means of the bolt, the portions 102 and 103 can be mutually secured. Though not shown, yet again also a male and female connector may be present with this connection technique.

The invention is to be understood not to be limited to the exemplary embodiments shown in the figures and described in the specification. For instance the connection between the portions can be performed in different ways such as by means of jig saw type of male and female connectors or any other kind of connector. The straight track portions may alternatively be manufactured by means of die extrusion. The kissing point are as an example provided between surface 2 and 4, any alternative installation of kissing points may be applied. For sound absorbing reasons and/or for further strength, portions may be filled up or partially filled up with a curable foam, such as poly urethane foam.

These and other modifications are considered to be variations that are part of the framework, the spirit and the scope of the invention outlined in the claims.

LIST OF REFERENCE SIGNS

1. Conveyor track portion
2. Guiding surface
3. Slit
4. Guiding surface
6. Side wall
7. Side wall
8. Rim
9. Abutting surface
10. Female connector
11. Side wall
12. Side wall
13. Upper wall
14. Lower wall
15. Guiding wall
16. Guiding wall
17. Central guiding channel
18. Central guiding channel
19. First masculine connector
20. Second masculine connector
21. Rim
22. Abutting surface
23. Abutting surface
24. Rim side edge
25. Rim side edge
26. Conveyor track portion
27. Conveyor track portion
28. Conveyor track portion
29. Male connector
30. Female connector
31. Male connector
32. Female connector
33. slit
34. slit
35. Curved conveyor track portion
36. Curved conveyor track portion
37. Curved conveyor track portion
38. Curved conveyor track portion
39. female connector
40. drive portion end
41. Motor
42. Support
43. Gear
44. drive axle
45. Axle bracket
46. Axle bracket
47. Sprocket wheel
48. Sprocket wheel
49. Sprocket wheel
50. Sprocket wheel
51. Return end
52. Male connector
53. female connector
54. Return axle
55. Guide wheel
56. Guide wheel
57. Guide wheel
58. Guide wheel
59. Axle bracket
60. Axle bracket
61. Belt or chain tensioner
62. Link
63. pin
64. roller
65. guiding rod
66. Guiding rod
67. Upright
68. Upright
69. plate
70. plate
71. beam
72. Roll
73. Connector
74. Bracket
75. Kissing point
76. Kissing point
77. Guiding hook
78. Finger
79. Guiding slit
80. Symmetry line
81. Protector
82. Edge
83. Edge
84. Edge
85. Symmetry line
86. Marking
87. Insert
88. Insert
89. Cross bar
90. Side panel
91. Side panel
92. Insert
93. Track portion
94. Track portion
96. Inner corner
97. Inner corner
98. Inner corner
99. Skewed surface
100. Skewed surface
101. Skewed surface
102. Track portion
103. Track portion
104. Fill up 105. Fill up
106. Bolt
107. Conveyor belt

The invention claimed is:

1. A conveyor part, suitable for a belt or chain conveyor, having a conveyor track portion, wherein the track portion is a piece or portion of a conveyor structure, on which a conveyor belt or conveyor chain can move, wherein the conveyor belt or chain is supported by the track portion, wherein the conveyor track portion comprises at least one rotary moulded conveyor track structure, and wherein at least one, first abutting end is provided with a first connector.

2. The conveyor part according to claim 1, wherein the inner space of the rotary moulded structure is hollow.

3. The conveyor part according to claim 1, wherein the conveyor track comprises a central guiding slit.

4. The conveyor part according to claim 1, wherein the conveyor track comprises slide bar connectors.

5. The conveyor part according to claim 4, wherein the slide bar connectors comprise longitudinal slits.

6. The conveyor part according to claim 1, wherein a second abutting is provided with a second connector.

7. The conveyor part according to claim 6, wherein the first and/or the second connector are of the male or of the female type.

8. The conveyor part according to claim 7, wherein a female type connector comprises a male connector receiving space.

9. The conveyor part according to claim 1, wherein the abutting first end opposing second end comprises a shaft or axle, configured to guide a belt or a chain return.

10. The conveyor part according to claim 9, wherein the shaft is connected to a drive, e.g. an electric motor, eventually provided with a gear.

11. The conveyor part according to claim 9, wherein the axle is configured to run idle.

12. A belt or a chain conveyor comprising a conveyor part according to claim 1.

13. A method of manufacturing a conveyor part, wherein at least one, first abutting end of the conveyor part is provided with a first connector, comprising the following steps, to be performed in any suitable order:
   a) providing a rotary mould having a cavity shaped as the outside of the conveyor part of claim 1;
   b) adding a thermoplastic or resinous material inside the mould;
   c) rotating the mould under gradually heating the mould;
   d) allowing the thermoplastic material to melt and to cover the inner walls of the mould or allowing the resinous material to cure on the inner walls of the mould;
   e) allowing the mould to cool; and
   f) opening the mould to remove the conveyor part.

* * * * *